United States Patent [19]

Klein et al.

[11] Patent Number: 5,207,619
[45] Date of Patent: May 4, 1993

[54] ADJUSTABLE, COMPACT ANTI-CHAIN WRAP DEVICE

[75] Inventors: Gary G. Klein; Darrell Voss, both of Chehalis; Chan K. Fong, Centralia, all of Wash.

[73] Assignee: Klein Bicycle Corporation, Chehalis, Wash.

[21] Appl. No.: 865,516

[22] Filed: Apr. 9, 1992

[51] Int. Cl.$^5$ ............................................... F16H 7/00
[52] U.S. Cl. ...................................... 474/101; 474/80
[58] Field of Search ............... 474/101, 111, 119, 140

[56] References Cited

U.S. PATENT DOCUMENTS 4,894,046  1/1990  Browning ........................ 474/80 X
4,960,402  10/1990  Klein et al. ........................ 474/80

Primary Examiner—Thuy M. Bui
Attorney, Agent, or Firm—Jim Zegeer

[57] ABSTRACT

An anti-chain wrap device for bicycles has a short mounting plate with large fastener holes for universal adjustments in the plane thereof and a clamp plate fastener with conventional fastener holes. Chain lifter fingers for contacting chain stuck on a chainring have portions bent out of the plane thereof to avoid interference on chainrings having extra teeth thereon. The fastener plate may have a fender mounting tab thereon as well as a control cable guide.

8 Claims, 2 Drawing Sheets

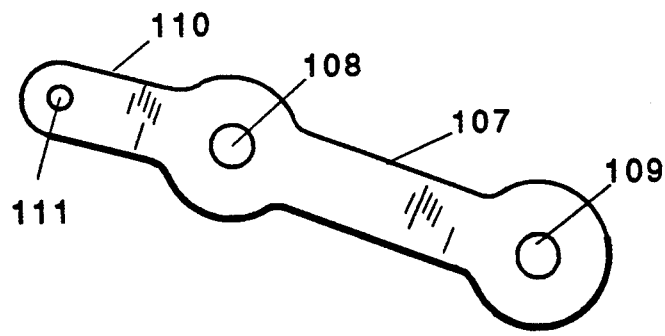
FIG. 5(a)
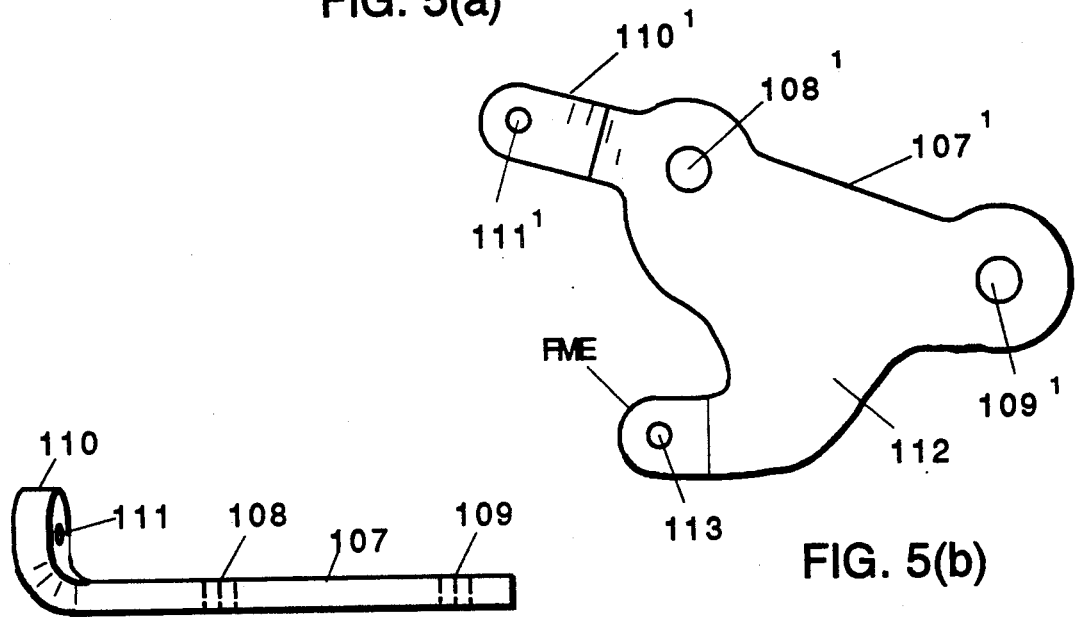
FIG. 5(b)
FIG. 6
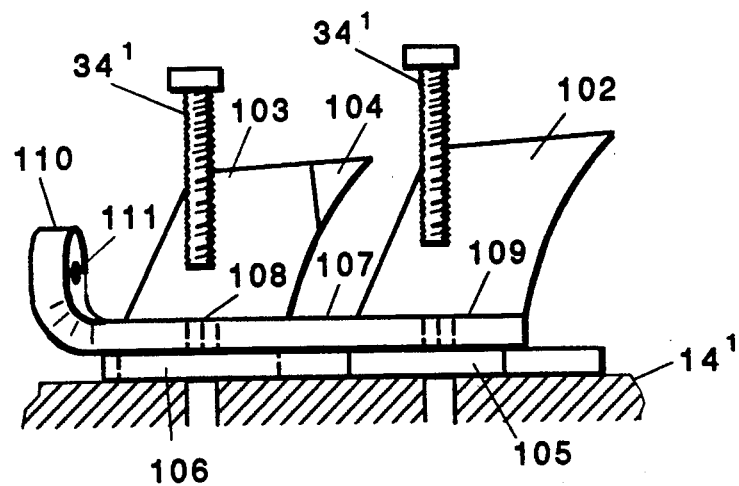
FIG. 7

ADJUSTABLE, COMPACT ANTI-CHAIN WRAP DEVICE

REFERENCE TO RELATED APPLICATIONS

This invention is an improvement on the anti-chair wrap device disclosed in Klein et al. U.S. Pat. No. 4,960,402, which is incorporated hereby by reference.

BACKGROUND AND BRIEF DESCRIPTION OF THE INVENTION

With the recent development of bicycle chainrings, the sizes of the chainrings have a lot more variety than before. One example is the Suntour TM Micro Drive TM chainring which has 20 teeth on the smallest chainring and 42 teeth on the largest chainring. With existing anti-chain wrap devices, there is difficulty mounting the device at the proper position to function efficiently. The invention provides for front-to-rear and side-to-side adjustability of the anti-chain wrap device in order to accommodate the wide variety of chainring sizes in use.

Another change on the chainring design is the addition of extra teeth on the frame side of the middle chainring for more efficient shifting to the middle chainring from the small chainring and because of the extra teeth, unequal spacing between the small and middle and middle and large chainrings. One example is the Shimano XTR chainring. When the Shimano XTR chainring is mounted with existing anti-chain wrap devices, the extra teeth will cause interference resulting in improper function of the device. The invention provides for clearance for the extra teeth and adjustability to fit different chainring spacings.

It is desirable to provide more clearance for the new wider tires, while attempting to keep the chainrings close into the center plane of the frame. While also trying to make the distance between the bicycle bottom bracket and the rear drive axle shorter. The existing anti-chain wrap devices become an additional clearance problem in this regard. The invention is more compact and allows for better clearances.

In order to accommodate the above two examples and other changes on the chainrings, the anti-wrap chain device is created so that it will have more adjustability and will not cause interference with the chainring when mounted at the correct position.

The invention also incorporates a fixed position rear derailleur cable guide and can incorporate a fixed position fender mount as well.

The object of the invention is to provide an improved anti-chain wrap device which has a narrower configuration for improved tire/chainring clearance, and can accommodate different sizes, spacings and unusual teeth configurations of chainrings, and provide consistent cable guide and fender mount locations.

DESCRIPTION OF THE DRAWINGS

The above and other objects, advantages and features of the invention will become more apparent when considered with the following specification and accompanying drawings wherein:

FIG. 5a is the top view of the fastening plate with the cable guides, FIG. 5b is a modification which includes a fender mounting or securing tab, FIG. 6 is the side view of the fastening plate, and FIG. 7 is a side view of the assembly being secured to a bicycle in the manner shown in FIG. 1.

DETAILED DESCRIPTION OF THE INVENTION

Figure 1:
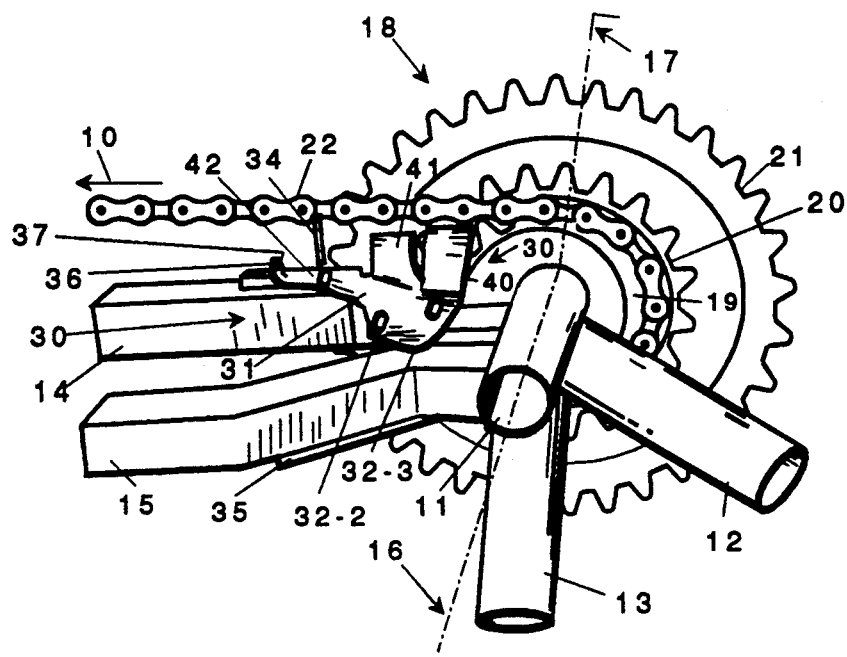
FIG. 1 is an isometric perspective view of one embodiment of anti-chain wrap device disclosed in Klein et al. U.S. Pat. No. 4,960,402.
Figure 2:
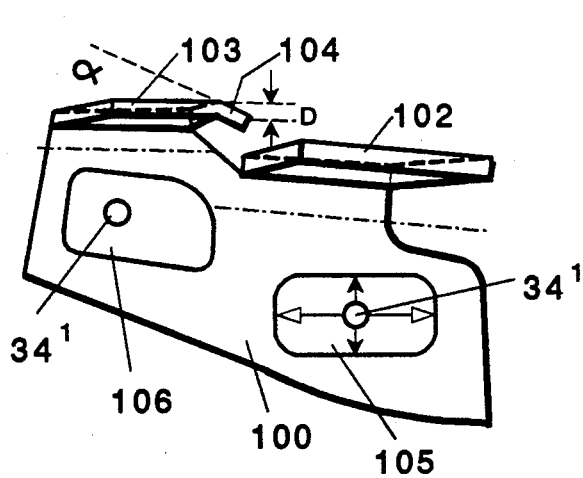
FIG. 2 is the top view of the improved anti-chain wrap device according to this invention.
Figure 3:
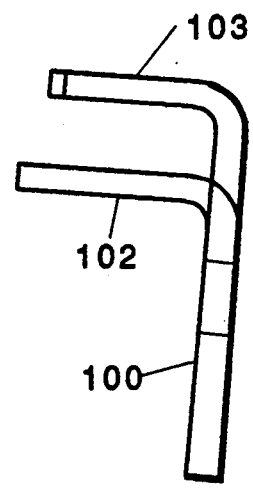
FIG. 3 is the front view of the improved anti-chain wrap device according to this invention.
Figure 4:
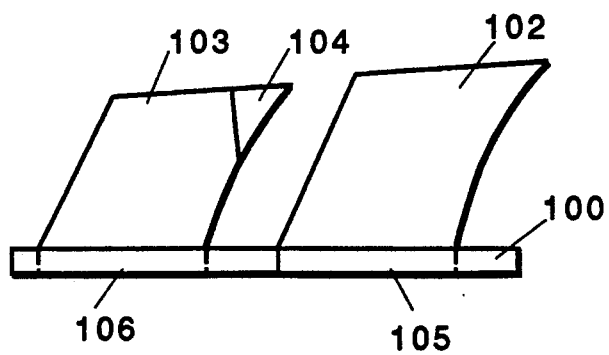
FIG. 4 is the side view of the improved anti-chain wrap device according to this invention.

As shown in U.S. Pat. No. 4,960,402, the invention is applicable to a bicycle having a chain drive system including a rear drive sprocket coupled to drive the rear wheel and a rear derailleur, which includes a spring tensioned arm for maintaining chain tension. In FIG. 1, (from U.S. Pat. No. 4,960,402), the rear sprocket and rear derailleur including the spring loaded tensioned arm are indicated diagrammatically by the arrow 10. A portion of the bicycle frame is illustrated including the bottom bracket 11, down tube 12, seat tube 13 and a pair of chainstays 14 and 15 secured to bottom bracket 11. Left and right crank arm and pedals 16 and 17 are diagrammatically illustrated by dashed lines so they do not obstruct illustration of the anti-chain wrap device of this invention. The front drive sprocket or chainring assembly 18 includes three chain rings 19, 20 and 21 which are of various diameters. Sprocket chain 22 is trained around chainring 19, a rear drive sprocket and the tension therein is maintained by the rear derailleur which includes a spring tensioned arm and idler wheel indicated by the arrow 10. A front derailleur (not shown), shifts the chain from chainring to chainring.

The anti-chain wrap device shown in U.S. Pat. No. 4,960,402 is a one-piece element 30 and, includes a flat mounting plate 31 having bolt holes 32-1, 32-2, and 32-3 through which pass mounting bolts 34 (there being one mounting bolt for each hole), which are threadably engaged with a clamp plate 35 on the opposite side of the forward ends of chainstays 14 and 15. Mounting holes 32-1, 32-2, and 32-3 are oblong so as to permit easy adjustment of the positions of the device in one direction relative to the chainring assembly 18.

A down turned (shown as upturned in the upside down view of FIG. 1) finger 36 is provided with a threaded hole 37 to serve as a control cable guide and can aid in installation and alignment of the device. Each of the mounting holes has an embossed or raised perimeter 32-1R, 32-1R and 32-3R and corresponding recesses formed from the pressing out of these elements in the base of plate 31.

In the anti-chain wrap device shown in FIG. 1, "lifters" 40, 41 and 42 are associated with chainrings 19, 20 and 21, respectively. Lifters or teeth 40 and 41 are curved so as to position them adjacent the side of the rotary path of chainrings 19 and 20, respectively, and raise the chain for the teeth for the two smaller rings so that they intersect the chainrings where the chain angle is low relative to the lifters. this permits the dislodgment of the chain at lower angles which requires much less force. It is known that more than 95% of chain wrap incidents occurs on the smaller of the usual three front chainrings so only two chain lifters are usually necessary to prevent the vast majority of chain wrap incidents.

The lifters at these respective heights easily lift the chain out of the chainring teeth. Moreover, the lifters 40, 41 and 42 are larger than would be necessary for any one set of chainrings so that they can be used to accommodate a wide range of chainring sizes.

THE PRESENT INVENTION

The anti-chain wrap device of this invention is shown in FIGS. 2-7 and has a flat plate 100 which is placed on the bottom most surface of the chainstay 14'. The lifters 102 and 103 are positioned to the smallest and medium chainrings, respectively, where more than 95% of chain wrap or suck incidents occur. With the proper installation, lifters 102 and 103 will intersect the chainring and will dislodge a stuck chain. Since the great majority of chain wrap or suck problems occur when on downshifts from the middle ring, in the preferred embodiment, only lifters 102 and 103 are necessary to control chain suck. This makes the device inherently easier to adjust to a variety of chainring sizes and spacings.

With the unique design of tooth projection 104, which is bent at an predetermined angle $\alpha$ with finger 103 and deflection distance D toward lifter finger 102, the interference of the device and extra teeth on the medium chainrings will be eliminated. Also, as shown on FIG. 2, the two large openings 105 and 106 will allow more universal adjustment in all the directions (indicated by the arrows in rectangular hole 105 about securement bolt 34') in the plane of flat plate 100 to accommodate different size and spacing of chainrings.

FIG. 5a shows the top view of a fastener plate 107 with mounting holes 108 and 109 for receiving bolts 34'. After correct positioning of the modified anti-chain wrap device, fastener plate 107 is placed on the surface of plate 100 with holes 108 and 109 positioned at the threaded holes TH on the chainstay 14'. The whole assembly is fastened to the chainstay with mounting bolts 34' that pass through holes 108, 109, 105 and 106.

FIG. 6 shows the front view of fastener plate 107 with bend 110 perpendicularly to 107. Bend 100 in this modified has cable guide aperture 111 design acts as the cable guide which allows the proper positioning of the rear derailleur cable.

In another modification of the fastening plate shown in FIG. 5b, a fender mounting arm 112 has an eyelet or tab FME with aperture 113 bent from the plane thereof is positioned in the center such that a fender may be secured thereto by a fastener in a fashion similar to the cable guide 110. This will position a securement point for any fender.

The invention is much more compact, even with a much greater range of adjustment than the device shown in U.S. Pat. No. 4,960,402. This is in part due to the new fastening plate 107, allowing a shorter distance between the bottom bracket spindle and the rear wheel axle, with improved tire clearance and the capability of using narrower chainstays. The anti-chain wrap device and fastening plate are made of a high strength wear resistant aluminum alloy such as 7075-T6.

With all the above modifications, the anti-chain wrap device can function more efficiently and have more adjustment on a larger variety of chainrings.

While a preferred embodiment of the invention has been shown and described, it will be appreciated that various modifications and adaptations of the invention will be apparent to those skilled in the art and it is intended that such adaptations and modifications be encompassed by the claims appended hereto.

What is claimed is:

1. In an anti-chain wrap device having a base plate with fastener holes therethrough, and a plurality of finger blade chain lifter members extending downwardly such that when mounted on a bicycle front drive sprocket assembly with plural chain rings thereon and adjacent the path of a chainring on said front drive sprocket assembly, respectively, when the chain is stuck on a given chainring of said front drive sprocket assembly, and is carried beyond where it should have released, the associated chain lifter contacts the chain and lifts it away from the given chainring as the front drive sprocket assembly rotates in the normal forward direction; the improvement comprising, said front drive sprocket assembly having at least one ring intermediate a smaller and a larger ring, and the chain finger lifter member has an end portion thereof bent out of the plane thereof sufficient to avoid interference with any extra teeth on its associated chainring.

2. The anti-chain wrap device defined in claim 1 wherein said fastener holes are enlarged to allow universal adjustment thereof in the plane of said base plate, a clamp plate fastener member having mounting holes with therein and fastener bolt means passing through said mounting holes and fastener holes to receive said device to a bicycle.

3. The anti-chain wrap device defined in claim 2 wherein said clamp plate fastener member includes means forming a control cable guide therein.

4. The anti-chain wrap device defined in claim 2 wherein said bicycle has a fender for the rear wheel thereof, and said clamp plate fastener member include means for securing said fender thereto.

5. In an anti-chain wrap device having a base plate with mounting holes therethrough and a plurality of finger blade chain lifter members extending downwardly such that when mounted on a bicycle front drive sprocket assembly, with pulsed chain rings thereon and adjacent the path of a chainring on said front drive sprocket assembly, respectively, when the chain is stuck on a given chainring of said front drive sprocket assembly, and is carried beyond where it should have released the associated chain lifter contacts the chain and lifts it away from the given chainring as the front drive sprocket assembly rotates in the normal forward direction; the improvement comprising, said base plate having a pair of enlarged holes therein to allow universal adjustment fore and aft, and left and right of said base plate in the plane thereof, and a clamp plate fastener member and bolt means passing through said clamp plate fastener and said pair of enlarged holes to secure said device to a bicycle.

6. The anti-chain wrap device defined in claim 5 wherein said clamp plate fastener includes means forming a cable guide therein.

7. The anti-chain wrap device defined in claim 5 wherein one of said finger blade includes a bend at the end thereof and said bend projects toward the plane of an adjacent finger blade.

8. The anti-chain wrap device defined in claim 5 wherein said bicycle has a fender for the rear wheel thereof, said clamp plate fastener member includes means for securing a fender thereto.

* * * * *